April 12, 1960 F. J. MESSINA 2,932,765
VOLTAGE REGULATION CIRCUITS
Filed July 24, 1958
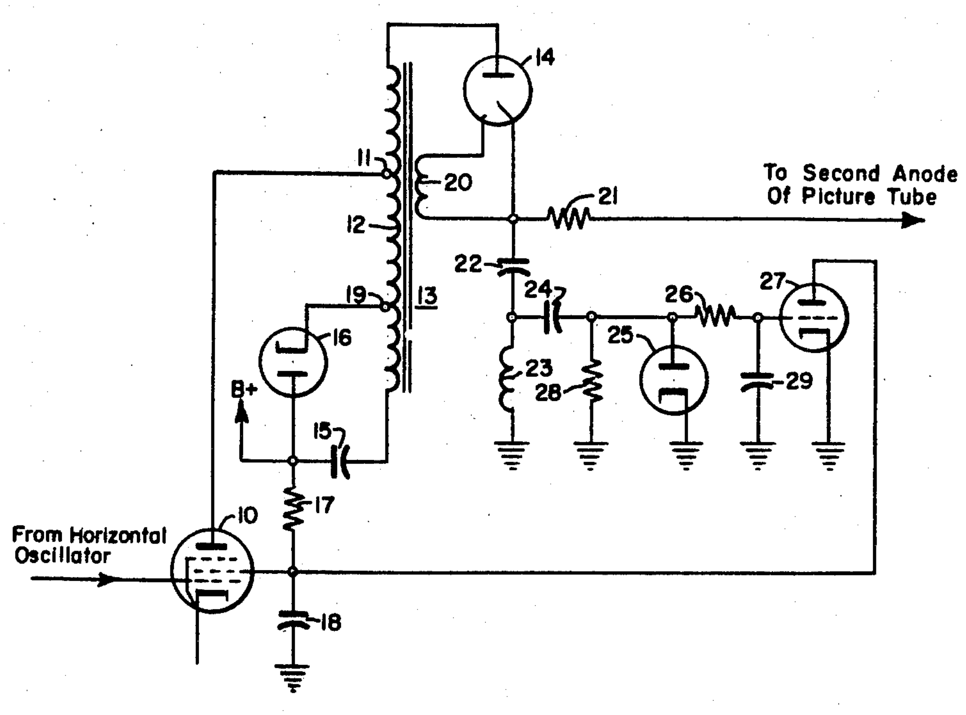
WITNESSES:
Bernard R. Gieguey
James F. Young
INVENTOR
Frank J. Messina
BY Benjamin DeWitt
ATTORNEY United States Patent Office 2,932,765

Patented Apr. 12, 1960

2,932,765

VOLTAGE REGULATION CIRCUITS

Frank J. Messina, Springfield, N.J., assignor to Westinghouse Electric Corporation, East Pittsburgh, Pa., a corporation of Pennsylvania Application July 24, 1958, Serial No. 750,779

4 Claims. (Cl. 315—27)

This invention relates to high voltage, direct current, power supply circuits for cathode ray tubes, and has as an object to maintain constant the voltage supplied to the second anodes of television picture tubes.

It is desirable for several reasons to maintain the voltage at the second anode of a television picture tube constant. Among these reasons are maintaining sharpness of focus at high beam currents, maintaining ion trap efficiency throughout the picture tube conduction range, maintaining a constant picture size, and maintaining scanning linearity.

This invention provides regulation of the voltage supplied to the second anode of a picture tube from a flyback circuit, by sampling the charging current of the voltage supply filter capacitor, which current is a function of picture tube beam current. An increase in beam current results in an increase in filter capacitor charging current during retrace time. This charging current is passed through an inductance member connected in series with the filter capacitor. The voltage appearing across this inductance is peak detected and applied to a control tube which, in turn, adjusts the screen grid voltage of the horizontal output tube of the flyback circuit, to cause it to supply power to the flyback transformer which is proportional to the beam current.

Two voltages are impressed across the inductance member during the retrace periods in which the capacitor charging current is being sampled. A differentiated (peaked) wave form of the retrace pulse, coupled in from the flyback transformer which charges the high voltage rectifier capacitance, is superimposed upon the capacitor charging current wave form. The differentiated wave form voltage varies to a very small extent with beam current so that at zero beam current there is a small voltage resulting from it. However, the inductance coil presents a relatively small impedance to the coupled-in retrace pulse, and presents a relatively large impedance to the filter capacitor charging current which contains high frequency harmonics, so that there is a large voltage ratio from zero beam current to maximum beam current across the coil for application to the peak detector.

This invention will now be described with reference to the annexed drawing which is a circuit schematic of one embodiment of the invention.

A horizontal output tube 10 of the usual beam power type, has its anode connected to a tap 11 on auto-transformer winding 12 of flyback transformer 13. The end of the winding 12 nearest the tap 11 is connected to the anode of high voltage rectifier tube 14. The other end of the winding 12 is connected through capacitor 15 to the anode of a damper diode 16 and to B+, and through a voltage dropping resistor 17 to the screen grid of the horizontal output tube 10. A bypass capacitor 18 is connected between the screen grid of the tube 10 and ground. The cathode of the damper diode 16 is connected to a tap 19 on the winding 12. The filament-cathode of the rectifier tube 14 is connected to a filament winding 20 of the transformer 13, and through filter resistor 21 to the second anode of a television picture tube which is not shown.

Filter capacitor 22 is connected to the cathode of the rectifier tube 14 and to one end of an inductance member 23, the other end of the inductance member 23 being connected to ground. In the preferred embodiment, impedance member 23 comprises a small R.F. choke coil having low impedance to the horizontal retrace voltage pulse and presenting a relatively high impedance to the capacitor charging current harmonics. The end of the coil 23 which is connected to the capacitor 22 is also connected through coupling capacitor 24 to the anode of peak detector diode 25, and through resistor 26 to the control grid of control tube 27. Resistor 28 is connected between the anode of the diode 25 and ground. The control grid of the triode 27 is connected through capacitor 29 to ground. The cathodes of the tubes 25 and 27 are grounded. The anode of the triode 27 is connected to the screen grid of the output tube 10, which screen grid also is connected to B+ through resistor 17. Thus tube 27 acts as a variable resistor between the screen grid of the output tube 10 and ground. A decrease in the conduction of the tube 27 results in decreased voltage drop across resistor 17 accompanied by an increase in voltage at the screen grid of the tube 10.

The input circuit of the horizontal output tube 10 preferably is connected to a horizontal oscillator which is not shown. The flyback transformer would have a winding connected to a horizontal deflection yoke which is not shown.

In operation, during the horizontal retrace periods when the output tube 10 is cut off, the collapsing magnetic field of the flyback transformer induces voltage pulses in the winding 12 which are rectified by the rectifier tube 14, and supplied through the filter resistor 21 to the second anode of the associated picture tube, the filter capacitor 22 smoothing out the voltage ripples. The charging current of the filter capacitor flows through the coil 23 to ground, producing a voltage drop across the coil which is proportional to the capacitor charging current which is proportional to the beam current of the picture tube.

The picture tube beam current varies with changes in picture shading from black to white. For an all black picture, the beam current is practically zero. For an all white picture, the beam current is maximum and may be several hundred microamperes.

The combination of the capacitor 24, the resistor 28 and the diode 23 peak-detects the positive pulse across the coil 23. An increase in the voltage of this positive pulse results in an increase in negative bias voltage developed across the diode 25. This increase in negative bias voltage is fed through the integrating filter network consisting of the resistor 26 and the capacitor 29 to the control grid of the control tube 27. The conductance of the control tube 27 decreases with an increase in negative bias applied to its grid, and causes the screen grid voltage of the horizontal output tube 10 to increase. This, in turn, causes the tube 10 to supply more power to the flyback transformer 13 to provide an increase in second anode voltage for the picture tube.

It would be desirable for the control voltage to drop to zero when the beam current decreases to zero. In this circuit this cannot be accomplished since even when there is zero beam current, there is a filter capacitor charging component resulting from the coupled-in retrace pulse. However, the pulse of the filter capacitor charging current contains many more high frequency harmonics than the coupled-in retrace voltage pulse so that the impedance of the coil 23 to the capacitor charging pulse is much larger than its impedance to the coupled-in pulse.

Thus, the voltage drop across the coil 23 resulting from the coupled-in voltage pulse is relatively small, while the voltage drop across the coil 23 resulting from the capacitor charging current is relatively large. This results in a large ratio in the control voltage between zero beam current and maximum beam current.

An increase in control voltage supplied to the grid of the control tube 27 causes the horizontal output tube 10 to supply more power to the flyback transformer 13 thereby maintaining the voltage supplied to the second anode of the picture tube substantially constant.

Transistors and crystal diodes could, of course, be used instead of the triode 27 and diode tube 25 respectively. In the annexed claims, a cathode is to be interpreted as an emitter, and an anode as a collector, of a transistor.

I claim as my invention:

1. In a high voltage, direct current, power supply including a flyback transformer, a deflection wave amplifier output tube having its anode connected to said transformer, said tube having a screen grid electrode, a high voltage rectifier connected to said transformer, a filter resistor for connecting said rectifier to a load connected to said rectifier, and a filter capacitor connected at one side to said rectifier and said resistor, the combination of an inductance connected to the other side of said capacitor and to ground, and means including means connected across said inductance for developing control voltages proportional to voltages appearing across said inductance, and for applying said control voltages to said screen grid electrode of said output tube.

2. In a high voltage, direct current, power supply including a flyback transformer, a deflection wave amplifier output tube having its anode connected to said transformer, a high voltage rectifier connected to said transformer, a filter resistor for connecting said rectifier to a load connected to said rectifier, and a filter capacitor connected at one side to said rectifier and said resistor, the combination of an inductance connected to the other side of said capacitor and to ground, means for detecting the peaks of voltage appearing across said inductance, and means for providing control voltages substantially proportional to said voltage peaks and for applying said control voltages to said output tube.

3. In a high voltage power supply including a flyback transformer, a horizontal deflection output amplifier tube having its anode connected to said transformer, a high voltage rectifier connected to said transformer, a filter resistor for connecting said rectifier to a load connected to said rectifier, and a filter capacitor connected at one side to said rectifier and to said resistor, the combination of an inductance member connected to the other side of said capacitor and to ground, a peak detector having an input circuit connected across said inductance and having an output circuit, and a control device having a control electrode connected to said output circuit and having an output electrode connected to said horizontal output tube so as to regulate the energy supplied thereby.

4. In a high voltage, direct current, power supply including a flyback transformer, a deflection amplifier output tube having its anode connected to said transformer, said tube having a screen grid electrode connected to B+, a high voltage rectifier connected to said transformer, a filter resistor connected to said rectifier for connecting said rectifier to a load, and a filter capacitor connected at one side to said rectifier and resistor, the combination of an inductance connected to the other side of said capacitor and to ground, a peak detector having an anode, a capacitor connecting said anode to said other side of said capacitor, a resistor connecting said anode to ground, a control tube having a control electrode, an anode, and a grounded cathode, a resistor connecting said control electrode of said control tube to said anode of said rectifier, a capacitor connecting said last-mentioned electrode to ground, and means connecting said anode of said control tube to said screen grid electrode of said deflection output tube.

References Cited in the file of this patent

UNITED STATES PATENTS

| | | |
|---|---|---|
| 2,697,798 | Schlesinger | Dec. 21, 1954 |
| 2,712,092 | Schwarz | June 28, 1955 |
| 2,822,503 | Campbell | Feb. 4, 1958 |
| 2,856,560 | Sanford | Oct. 14, 1958 |